Patented Oct. 16, 1923.

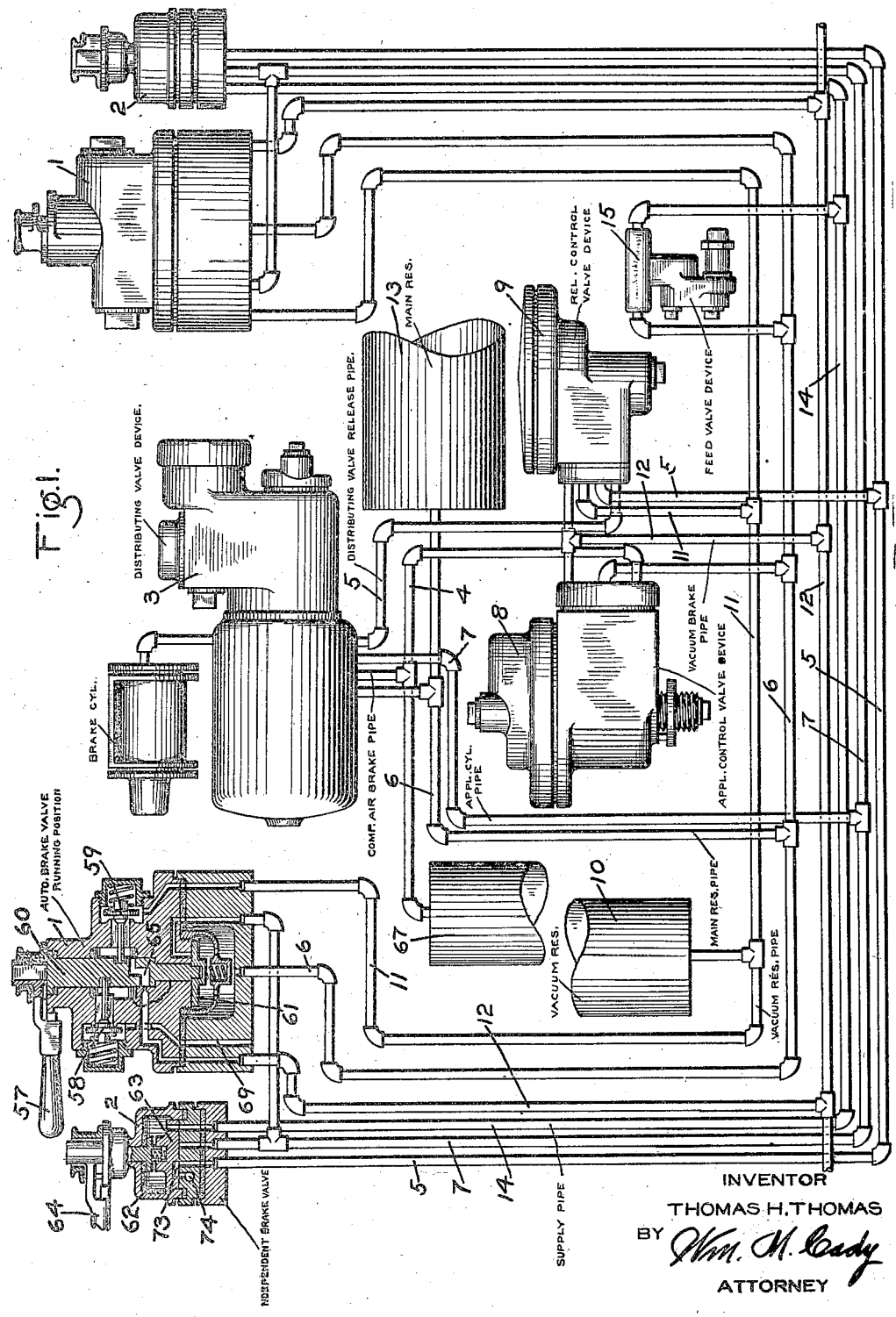

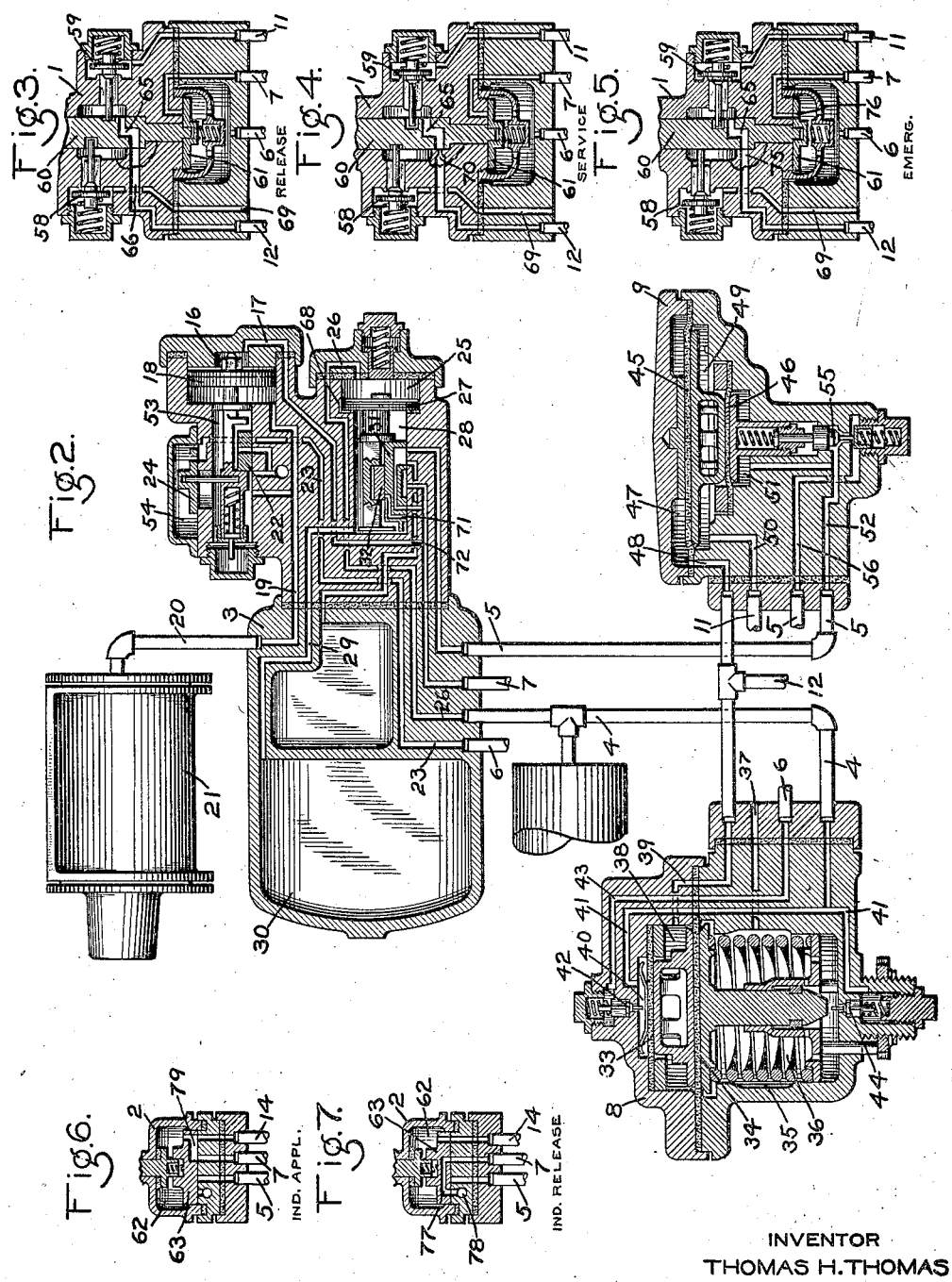

1,471,073

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE EQUIPMENT.

Application filed February 8, 1921. Serial No. 443,360.

*To all whom it may concern:*

Be it known that I, THOMAS H. THOMAS, a citizen of the United States, residing at Edgewood, in the county of Allegheny and State of Pennsylvania, have invented new and useful Improvements in Fluid-Pressure Brake Equipments, of which the following is a specification.

This invention relates to a fluid pressure brake equipment, and more particularly to a combined vacuum and compressed air brake.

In some cases, cars are equipped with vacuum brakes and it is desired to operate the vacuum brakes on the cars while the brakes on the locomotive are operated by compressed air.

The principal object of my invention is to provide an improved combined vacuum and compressed air brake of the above character and in which the compressed air brakes on the locomotive may be operated simultaneously with or independently of the vacuum brakes on the cars.

In the accompanying drawings; Fig. 1 is a diagrammatic view of a locomotive brake equipment adapted in accordance with my invention for controlling compressed air brakes on the locomotive and vacuum brakes on the cars; Fig. 2 a sectional view of the locomotive distributing valve device and the associated application and release control valve devices; Figs. 3, 4, and 5, sectional views of the automatic brake valve device in the respective positions of release, service, and emergency; and Figs. 6 and 7, sectional views of the independent brake in the respective positions of application and release.

As shown in the diagrammatic drawing, Fig. 1, the locomotive equipment may comprise an automatic brake valve 1 and an independent brake valve 2, and in the case of an electric locomotive, brake valves may be located at each end of the locomotive, as shown in the drawing.

A distributing valve device 3 is provided, having connection to a compressed air brake pipe 4, a distributing valve release pipe 5, a main reservoir pipe 6, and an application cylinder pipe 7.

In order to interlock the operation of the vacuum brakes with the operation of the compressed air brakes, an application control valve device 8, and a release control valve device 9 are provided.

The vacuum brake includes a vacuum reservoir 10 connected to a vacuum reservoir pipe 11 and adapted to be exhausted, so that a partial vacuum is maintained therein and a vacuum brake pipe 12 and the compressed air brake includes a main reservoir 13, connected to a main reservoir pipe 6, and a supply pipe 14, connected to the independent brake valve 2 and adapted to be charged with fluid under pressure from the main reservoir pipe 6 as reduced by the operation of a feed or reducing valve device 15 of the usual construction.

The distributing valve device 3 may be of the usual construction comprising an application portion and a triple or equalizing valve portion, the application portion having an application cylinder 16, connected by passage 17 to application cylinder pipe 7 and containing a piston 18, a release valve chamber 53, connected by passage 19 and pipe 20 to brake cylinder 21 and containing a release valve 22, and an application valve chamber 54, connected by passage 23 to the main reservoir pipe 6, and containing application valve 24, said valves being operated by piston 18.

The equalizing portion has a piston chamber 25, connected by passage 26 to the compressed air brake pipe 4 and containing an equalizing piston 27 and a valve chamber 28, connected by passage 29 to a pressure chamber 30 and containing a main slide valve 31 and a graduating valve 32 adapted to be operated by piston 27 for controlling the admission and release of fluid under pressure to and from the application cylinder 16.

The application control valve device 8 may comprise a casing containing operatively connected differential area diaphragms 33 and 34, the larger diaphragm 34 having a chamber 35 at one side containing a spring 36, acting on the diaphragm, said chamber being connected to an atmospheric exhaust port 37.

The chamber 38, intermediate the diaphragms 33 and 34 is connected by a passage 39 to the vacuum brake pipe 12, and chamber 40 at the outer face of diaphragm 33 is connected by passage 41 with the compressed air brake pipe 4.

The movement of the diaphragms 33 and 34 in one direction is adapted to open a valve 42 for supplying fluid under pressure from the main reservoir pipe 6, through passage 43 to chamber 40 and movement of the diaphragms in the opposite direction is adapted to open a valve 44 for venting fluid under pressure from the compressed air brake pipe 4 to chamber 35.

The release control valve device 9 may comprise a casing containing operatively connected differential area diaphragms 45 and 46, the larger diaphragm 45 having the chamber 47 at its outer face connected by a passage 48 to the vacuum brake pipe 12, the chamber 49 intermediate the diaphragms being connected by a passage 50 with the vacuum reservoir pipe 11.

The chamber 51 at the outer face of diaphragm 46 is connected by a passage 52 to the distributing valve side of the distributing valve release pipe 5 and a valve 55, operated by the movement of the diaphragms 45 and 46 controls communication from passage 52, to a passage 56 leading to the brake valve side of the distributing valve pipe 5.

The automatic brake valve 1 may comprise a casing containing a valve stem 60 adapted to be operated by a handle 57, a vacuum brake application valve 58 of the poppet type and a vacuum brake release valve 59 of the poppet type adapted to be operated by means of cam faces provided on the stem 60. Said stem also operates a rotary slide valve 61.

The independent brake valve 2 may comprise a casing, having a valve chamber 62 containing a rotary slide valve 63, adapted to be operated by a handle 64.

In operation, the main reservoir 13 is maintained charged with fluid under pressure to a predetermined degree in the usual manner, and the vacuum reservoir 10 is kept at a partial vacuum at all times.

The valve chamber 54 of the distributing valve device is maintained charged with fluid at main reservoir pressure supplied from main reservoir pipe 6 through passage 23, and with the automatic brake valve in release position as shown in Fig. 3, the poppet valve 59 is opened, so that the vacuum reservoir pipe 11 is connected through a port 65 in the stem 60 and a large passage 66 with the vacuum brake pipe 12. A partial vacuum is thus rapidly produced in the vacuum brake pipe.

In the application control valve device 8, vacuum brake pipe pressure is present in chamber 38 and the pressure of spring 36 operates to move the diaphragms 33 and 34 so as to open valve 42 and allow fluid from the main reservoir to flow through passage 43 to passage 41 and the compressed air brake pipe 4. When the brake pipe 4 has been charged to a pressure slightly exceeding the pressure of spring 36, the valve 42 is permitted to close through the movement of the diaphragm 33 by the pressure in the brake pipe 4 and chamber 40.

In order to provide an increased brake pipe volume, a reservoir 67 may be connected to the brake pipe. Fluid supplied to the brake pipe 4 flows to the piston chamber 25 of the equalizing valve device, and thence through the feed groove 68 to valve chamber 28, also charging the pressure chamber 30 through passage 29.

If leakage should occur from the brake pipe 4, the valve 42 will be again opened to supply fluid to the brake pipe so as to maintain the pressure therein, as will be evident.

If it is desired to effect a service application of the brakes on the cars and the locomotive, the automatic brake valve 1 is turned to service application position, as shown in Fig. 4, in which the vacuum brake pipe 12 is connected to an atmospheric port 69, through a restricted port 70, port 65, and the open poppet valve 58.

The increase in pressure in the vacuum brake pipe 12, as thus effected, causes an application of the vacuum brakes on the cars of the train in the usual manner and on the locomotive, the increase in pressure in the vacuum brake pipe acts in chamber 38 of the application control valve device 8 on the differential area of the diaphragm 34, so as to cause a movement of the diaphragms 33 and 34 to open the valve 44.

Fluid under pressure is then vented from the compressed air brake pipe 4 through passage 41, past the valve 44 to chamber 35 and thence to the atmospheric port 37.

The reduction in brake pipe pressure thus produced causes the movement of the equalizing piston 27 to application position, in which fluid under pressure is supplied from the pressure chamber 30 through port 71 to passage 72 and the application cylinder 16. The application piston 18 is then shifted to application position, in which fluid under pressure is supplied from valve chamber 54 to chamber 53 and thence through passage 19 to the locomotive brake cylinder 21.

The brakes may be released on the cars and locomotive by turning the automatic brake valve 1 to release position, so as to connect the vacuum brake pipe 12 to the vacuum reservoir.

The partial vacuum produced in the vacuum brake pipe then effects the release of the brakes on the cars of the train and on the locomotive, the reduction in pressure in chamber 38 of the application control valve device 8, causes the movement of the diaphragms 33 and 34 so as to open valve 42 and permit the recharging of the brake pipe 4. The equalizing piston 27 is then shifted to release position and fluid is released from the application chamber 16 through passage 17, pipe 5, passage 52 in the release control valve device 9 and past the open valve 55 to passage 56 and the brake valve portion of pipe 5.

The independent brake valve 2 being in running position as shown in Fig. 1 the distributing valve release pipe is open to the atmosphere through cavity 73 and exhaust port 74, so that fluid is vented from application chamber 16 and the application piston 18 is shifted to release position to effect the release of fluid from the locomotive brake cylinder 21.

A graduated release of the brakes may be effected by first moving the automatic brake valve to release position and then to lap position. A partial restoration of the vacuum in the vacuum brake pipe is thus produced, which causes a partial release of the brakes on the cars, while on the locomotive, the pressure in chamber 47 being reduced with the vacuum brake pipe, permits the movement of the diaphragms 45 and 46 by the application cylinder pressure acting in chamber 51 on diaphragm 46, so as to open valve 55 and permit fluid to be vented from the application cylinder 16 thereby effecting the release of fluid from the brake cylinder 21 by operation of the application piston 18 as hereinbefore described.

When the application cylinder pressure acting in chamber 51 has been reduced a certain amount by exhaust through the distributing valve release pipe 5, the diaphragms 45 and 46 will be operated to close the valve 55 and thus prevent the further release of fluid from the brake cylinder 21 through the operation of the distributing valve device. It will thus be seen that the pressure in the locomotive brake cylinders is partially released to correspond with the partial release of the vacuum brakes on the cars of the train, so that a graduated release of the brakes on both the cars and the locomotive may be effected.

An emergency application of the brakes may be effected by turning the brake valve handle to emergency position, as shown in Fig. 5. The operation in this case is substantially the same as in a service application, except that fluid is supplied from the atmosphere to the vacuum brake pipe 12 through a large port 75, instead of a restricted port, so as to secure a more rapid increase in pressure in the vacuum brake pipe. Also, in emergency position, the application cylinder pipe 7 is connected by a port 76 in the rotary valve 61 with main reservoir pipe 6, so that fluid at main reservoir pressure is supplied directly to the application cylinder 16 of the distributing valve device to effect a prompt movement of the application piston 18 to application position.

When the brakes have been applied, the brakes on the locomotive may be released independently without releasing the train brakes, by moving the independent brake valve 2 to release position, as shown in Fig. 7, in which the application cylinder pipe 7 is connected to the exhaust through cavity 77 and exhaust port 78.

Fluid under pressure is then released from the application cylinder 16, so that the application piston 18 is moved to release position, to effect the release of fluid from the locomotive brake cylinder 21, while the vacuum brakes are held applied, since the automatic brake valve is left in lap position.

The locomotive brakes may be held applied and the train brakes released by placing the independent brake valve 2 in lap position, closing the distributing valve release pipe exhaust and then moving the automatic brake valve 1 to release position, in which the vacuum brakes are released, the release on the locomotive being prevented by the closing of the exhaust from the distributing valve release pipe.

The locomotive brakes may be applied independently without applying the train brakes by moving the independent brake valve 1 to application position, as shown in Fig. 6, in which the application cylinder pipe 7 is connected by a cavity 79 with the supply pipe 14, so that fluid from the main reservoir as reduced by the action of the feed valve device 15 is supplied directly to the application cylinder 16 of the distributing valve device to effect the operation of the application piston 18 and thus cause an application of the brakes on the locomotive.

Having now described my invention, what I claim as new and desire to secure by Letters Patent, is:—

1. The combination with a vacuum brake pipe for controlling a vacuum brake system, of a compressed air brake pipe, a valve means operated by variations in pressure in the compressed air brake pipe for controlling compressed air brakes, and means operated according to the pressure in the vacuum brake pipe for controlling the pressure in the compressed air brake pipe.

2. The combination with a vacuum brake pipe for controlling a vacuum brake system, of a compressed air brake pipe and a valve mechanism operated upon an increase in pressure in the vacuum brake pipe for effecting a reduction in pressure in the compressed air brake pipe.

3. The combination with a vacuum brake pipe for controlling a vacuum brake system, of a compressed air brake pipe and a valve mechanism operated upon a decrease in pressure in the compressed air brake pipe for supplying fluid under pressure to said pipe and operated upon an increase in pressure in the vacuum brake pipe for effecting a reduction in pressure in the compressed air brake pipe.

4. The combination with a vacuum brake pipe for controlling a vacuum brake system, of a compressed air brake pipe and a valve mechanism for normally maintaining the pressure in the compressed air pipe at a predetermined degree and operated upon a decrease in pressure in the vacuum brake pipe for effecting a reduction in pressure in the compressed air brake pipe.

5. The combination with a vacuum brake pipe normally containing fluid at a pressure less than atmospheric pressure, an increase in pressure in said pipe being adapted to apply the brakes in a vacuum brake system, of a compressed fluid brake pipe normally containing fluid under pressure, a reduction in pressure in which is adapted to effect an application of the brakes in a compressed fluid brake system, and means operated upon an increase in pressure in the vacuum brake pipe for effecting a reduction in pressure in the compressed fluid brake pipe.

6. In a fluid pressure brake, the combination with a vacuum brake pipe and a compressed fluid brake pipe, of an application control valve device comprising a valve and a movable abutment subject to the opposing pressures of a spring and the pressures of the vacuum brake pipe and the compressed fluid brake pipe and operated upon an increase in pressure in the vacuum brake pipe for actuating said valve to vent fluid under pressure from the compressed fluid brake pipe.

7. In a fluid pressure brake, the combination with a vacuum brake pipe and a compressed fluid brake pipe, of an application control valve device comprising differential diaphragms subject to the opposing pressures of the compressed fluid brake pipe and a spring and subject on the differential area of one diaphragm to the pressure in the vacuum brake pipe, and a valve operated by said diaphragms upon an increase in pressure in the vacuum brake pipe for effecting a reduction in pressure in the compressed fluid brake pipe.

8. In a fluid pressure brake, the combination with a vacuum brake pipe and a compressed fluid brake pipe, of an application control valve device comprising differential diaphragms subject to the opposing pressures of the compressed fluid brake pipe and a spring and subject on the differential area of one diaphragm to the pressure in the vacuum brake pipe, a valve operated by said diaphragms for supplying fluid under pressure to said compressed fluid brake pipe, and a valve operated by said diaphragms upon an increase in pressure in the vacuum brake pipe for effecting a reduction in pressure in the compressed fluid brake pipe.

9. In a fluid pressure brake, the combination with a vacuum brake pipe, of an application valve device comprising an application cylinder and a piston operated by an increase or a decrease in pressure in the application cylinder for respectively effecting the application and release of the brakes, and a valve device operated upon a decrease in pressure in the vacuum brake pipe for opening communication through which fluid is released from the application cylinder.

10. In a fluid pressure brake, the combination with a vacuum brake pipe, of an application valve device comprising an application cylinder and a piston operated by an increase or a decrease in pressure in the application cylinder for respectively effecting the application and release of the brakes, a brake valve device for controlling the release of fluid from the application cylinder, and a release control valve device subject to the pressure in the vacuum brake pipe for controlling communication through which fluid is released from the application cylinder.

11. In a fluid pressure brake, the combination with a vacuum brake pipe, of an application valve device comprising an application cylinder and a piston operated by an increase or a decrease in pressure in the application cylinder for respectively effecting the application and release of the brakes, and a valve device operated upon an increase in pressure in the vacuum brake pipe for closing communication through which fluid is released from the application cylinder.

12. In a fluid pressure brake, the combination with a vacuum brake pipe, of an application valve device comprising an application cylinder and a piston operated by an increase or a decrease in pressure in the application cylinder for respectively effecting the application and release of the brakes, and a valve device subject to the pressure in the vacuum brake pipe for controlling the release of fluid from the application cylinder.

13. In a fluid pressure brake, the combination with a vacuum brake pipe for controlling a vacuum brake system and a compressed fluid brake pipe for controlling a compressed fluid brake, of an application control valve device operated upon an increase in pressure in the vacuum brake pipe for effecting a reduction in pressure in the compressed fluid brake pipe and a release control valve device operated upon an increase in pressure in the vacuum brake pipe for preventing the release of the compressed fluid brake.

14. In a fluid pressure brake, the combination with a vacuum brake pipe for controlling a vacuum brake system and means for controlling the application and release of compressed fluid brakes including a chamber, an increase or decrease in pressure in which is adapted to respectively effect an application or release of the compressed fluid brake, a valve for controlling the release of fluid from said chamber, and a movable abutment, subject to the opposing pressures of the vacuum brake pipe and said chamber for operating said valve.

15. In a fluid pressure brake, the combination with a vacuum brake pipe for controlling a vacuum brake system, of a compressed fluid brake device having a chamber, variations in pressure in which is adapted to control the application and release of the brakes and a release control valve device comprising a valve for controlling the release of fluid from said chamber and differential area diaphragms subject to the opposing pressures of the vacuum brake pipe and said chamber for operating said valve.

16. The combination with a vacuum brake pipe for controlling a vacuum brake system, of a brake pipe normally containing fluid under pressure and means subject to the pressure in the vacuum brake pipe for controlling the pressure in the compressed fluid brake pipe.

17. The combination with a vacuum brake pipe for controlling a vacuum brake system, of a brake pipe normally containing fluid under pressure greater than atmospheric pressure and means subject to the pressure in the vacuum brake pipe for controlling the pressure in the compressed fluid brake pipe.

In testimony whereof I have hereunto set my hand.

THOMAS H. THOMAS.